(12) United States Patent
Pitigoi-Aron et al.

(10) Patent No.: US 9,436,214 B2
(45) Date of Patent: Sep. 6, 2016

(54) SYSTEM AND METHODS OF REDUCING ENERGY CONSUMPTION BY SYNCHRONIZING SENSORS

(71) Applicant: QUALCOMM, Incorporated, San Diego, CA (US)

(72) Inventors: Radu Pitigoi-Aron, San Jose, CA (US); Leonid Sheynblat, Hillsborough, CA (US); Carlos Manuel Puig, Santa Clara, CA (US); Justin Black, Santa Clara, CA (US); Rashmi Kulkarni, San Carlos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 161 days.

(21) Appl. No.: 14/304,699

(22) Filed: Jun. 13, 2014

(65) Prior Publication Data

US 2015/0134996 A1    May 14, 2015

Related U.S. Application Data

(60) Provisional application No. 61/903,243, filed on Nov. 12, 2013.

(51) Int. Cl.
*G06F 1/12* (2006.01)
*G06F 1/14* (2006.01)
*G06F 1/32* (2006.01)

(52) U.S. Cl.
CPC . *G06F 1/12* (2013.01); *G06F 1/14* (2013.01); *G06F 1/329* (2013.01); *Y02B 60/144* (2013.01)

(58) Field of Classification Search
CPC ......... H04J 3/0638; G06F 1/12; G06F 1/325
See application file for complete search history.

(56) References Cited

U.S. PATENT DOCUMENTS

| | | | |
|---|---|---|---|
| 6,374,191 B1 | 4/2002 | Tsuchiya et al. | |
| 7,106,658 B1 | 9/2006 | Cray et al. | |
| 7,558,157 B1 | 7/2009 | Gardner et al. | |
| 8,050,881 B1 | 11/2011 | Yeung et al. | |
| 2004/0128091 A1* | 7/2004 | Delin | G01D 21/00 702/75 |
| 2011/0276820 A1 | 11/2011 | Patel et al. | |
| 2012/0278645 A1 | 11/2012 | Cornelius et al. | |
| 2013/0001834 A1 | 1/2013 | El-Siblani et al. | |

FOREIGN PATENT DOCUMENTS

WO    2011093916 A1    8/2011

OTHER PUBLICATIONS

International Search Report and Written Opinion—PCT/US2014/063907—ISA/EPO—Jan. 28, 2015.

\* cited by examiner

*Primary Examiner* — Albert Wang
(74) *Attorney, Agent, or Firm* — Blakely Sokoloff Taylor & Zafman, LLP

(57) ABSTRACT

Aspects of the invention are related to a method for synchronizing a first sensor clock of a first sensor. The exemplary method comprises: correcting the first sensor clock for a first time, transferring data from the first sensor, and correcting the first sensor clock for a second time, wherein a time interval between two corrections of the first sensor clock is selected such that the first sensor clock is sufficiently aligned with a processor clock of a processor over the time interval.

18 Claims, 3 Drawing Sheets

SYSTEM AND METHODS OF REDUCING ENERGY CONSUMPTION BY SYNCHRONIZING SENSORS

CROSS-REFERENCE TO RELATED APPLICATIONS

This application is based upon and claims the benefit of priority of prior patent application No. 61/903,243 entitled SYSTEM AND METHODS OF REDUCING ENERGY CONSUMPTION BY SYNCHRONIZING SENSORS filed on Nov. 12, 2013.

FIELD

The subject matter disclosed herein relates to electronic devices, and more particularly to methods, apparatuses, and systems for synchronizing sensor clocks.

BACKGROUNDS

Modern-day mobile devices are packed with sensors. Usually, a data processing unit, such as a System on Chip (SoC), is provided to receive and process data collected by sensors. To conserve power, the data processing unit is regularly placed into a sleep state when no data is being transferred from sensors to the data processing unit.

Two methods of transferring data from sensors to a data processing unit are commonly utilized. In the first method, also known as the asynchronous method, a sensor with available data to transfer notifies the data processing unit by issuing a Data Ready Interrupt (DRI) signal through a dedicated DRI pin, which wakes the data processing unit up, and transfers the data when the data processing unit is ready. In the second method, also known as the synchronous method, the data processing unit wakes up from the sleep state spontaneously at predetermined time intervals, polls the sensors, and receives data. The synchronous method is more energy efficient in a device comprising multiple sensors because data transfers from more than one sensors may be consolidated into a single poll and transfer session.

Ideally, assuming a sensor delivers only the most current result, polling a sensor at a frequency that coincides with the sensor's sampling frequency is necessary and sufficient to obtain all the data collected by the sensor. However, because the data processing unit and the sensors do not usually share a clock signal and misalignment of clock signals may result, some sensor data samples may be lost and some sensor data samples may be read twice even when the sensors are polled at their sampling frequencies. The phenomenon is exacerbated by the fact that some sensors have a poor clock accuracy (i.e., ±15% deviation over the temperature range and from device to device).

SUMMARY

An aspect of the invention is related to a method for synchronizing a first sensor clock of a first sensor. The exemplary method comprises: correcting the first sensor clock for a first time, transferring data from the first sensor, and correcting the first sensor clock for a second time, wherein a time interval between two corrections of the first sensor clock is selected such that the first sensor clock is sufficiently aligned with a processor clock of a processor over the time interval.

Another aspect of the invention is related to a computing device, comprising: a first sensor including or coupled to a first sensor clock; and a processor including or coupled to a processor clock to: correct the first sensor clock for a first time; transfer data from the first sensor; and correct the first sensor clock for a second time, wherein a time interval between two corrections of the first sensor clock is selected such that the first sensor clock is sufficiently aligned with the processor clock over the time interval.

Still another aspect of the invention is related to a computing device, comprising: means for correcting a first sensor clock of a first sensor for a first time; means for transferring data from the first sensor; and means for correcting the first sensor clock for a second time, wherein a time interval between two corrections of the first sensor clock is selected such that the first sensor clock is sufficiently aligned with a processor clock of a processor over the time interval.

Yet another aspect of the invention is related to a non-transitory computer-readable medium including code which, when executed by a processor, causes the processor to perform a method comprising: correcting a first sensor clock of a first sensor for a first time; transferring data from the first sensor; and correcting the first sensor clock for a second time, wherein a time interval between two corrections of the first sensor clock is selected such that the first sensor clock is sufficiently aligned with a processor clock of the processor over the time interval.

DETAILED DESCRIPTION

Aspects of the invention are disclosed in the following description and related drawings directed to specific embodiments of the invention. Alternate embodiments may be devised without departing from the scope of the invention. Additionally, well known elements of the invention may not be described in detail or may be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device (e.g., a server or device). It will be recognized that various actions described herein can be performed by specific circuits (e.g., application specific integrated circuits), by program instructions being executed by one or more processors, or by a combination of both. Additionally, these sequences of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Figure 1:
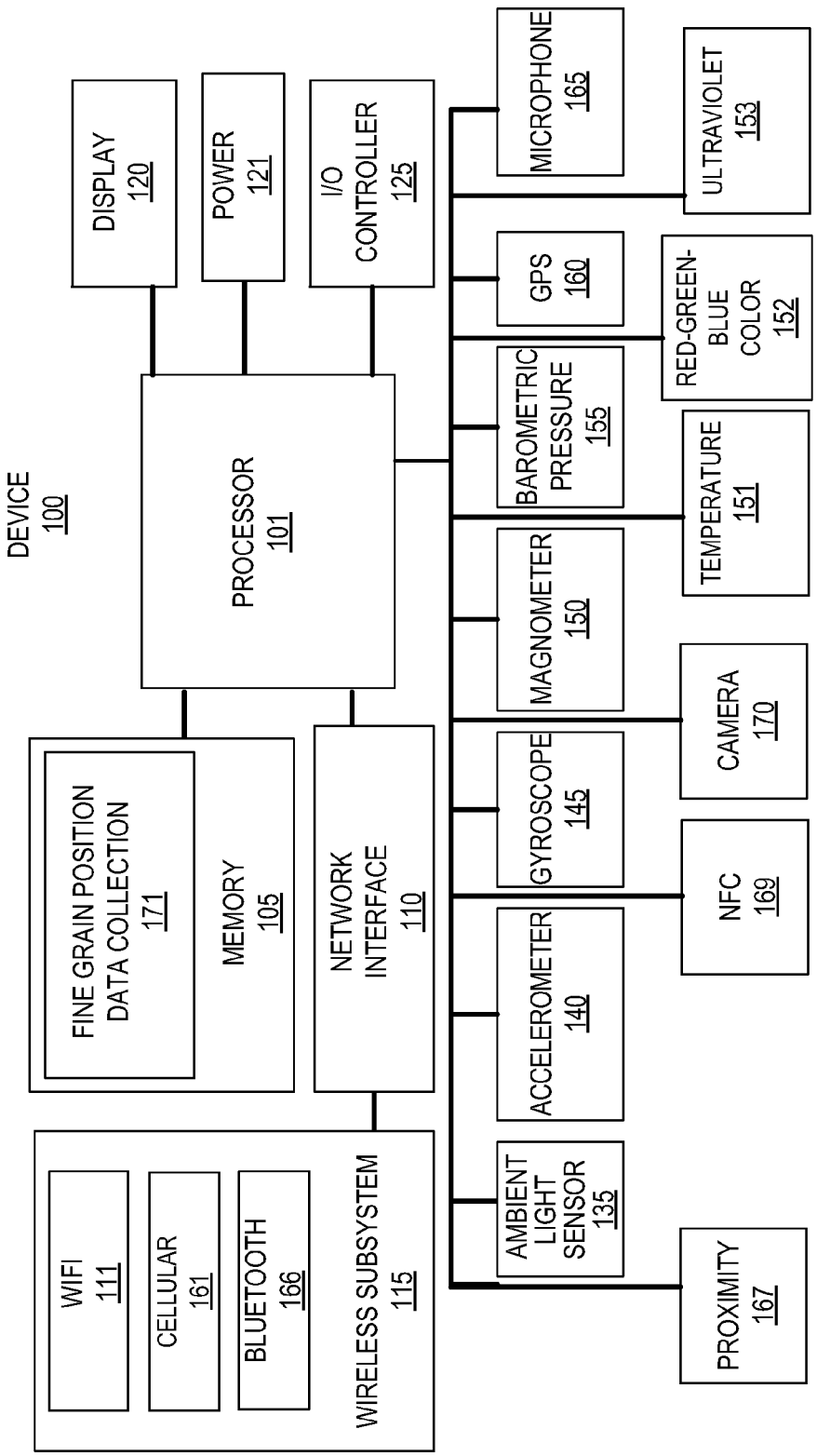
FIG. 1 is block diagram illustrating an exemplary mobile device in which embodiments of the invention may be practiced.

FIG. 1 is block diagram illustrating an exemplary mobile device in which embodiments of the invention may be practiced. The system may be a device (e.g., the device 100), which may include one or more processors 101, a memory 105, I/O controller 125, and network interface 110. Device 100 may also include a number of device sensors coupled to one or more buses or signal lines further coupled to the processor 101. It should be appreciated that device 100 may also include a display 120, a user interface (e.g., keyboard, touch-screen, or similar devices), a power device 121 (e.g., a battery), as well as other components typically associated with electronic devices. In some embodiments, device 100 may be a mobile or non-mobile device. Herein "processor" and "data processing unit" are used interchangeably.

The device (e.g., device 100) can include sensors such as ambient light sensor (ALS) 135, accelerometer 140, gyroscope 145, magnetometer 150, temperature sensor 151, barometric pressure sensor 155, red-green-blue (RGB) color sensor 152, ultra-violet (UV) sensor 153, UV-A sensor, UV-B sensor, compass, proximity sensor 167, near field communication (NFC) 169, and/or Global Positioning Sensor (GPS) 160. In some embodiments, multiple cameras are integrated or accessible to the device. For example, a mobile device may have at least a front and rear mounted camera. In some embodiments, other sensors may also have multiple installations or versions.

Memory 105 may be coupled to processor 101 to store instructions for execution by processor 101. In some embodiments, memory 105 is non-transitory. Memory 105 may also store one or more models or modules to implement embodiments described below. Memory 105 may also store data from integrated or external sensors.

Network interface 110 may also be coupled to a number of wireless subsystems 115 (e.g., Bluetooth 166, WiFi 111, Cellular 161, or other networks) to transmit and receive data streams through a wireless link to/from a wireless network, or may be a wired interface for direct connection to networks (e.g., the Internet, Ethernet, or other wired or wireless systems). The mobile device may include one or more local area network transceivers connected to one or more antennas. The local area network transceiver comprises suitable devices, hardware, and/or software for communicating with and/or detecting signals to/from wireless APs, and/or directly with other wireless devices within a network. In one aspect, the local area network transceiver may comprise a WiFi (802.11x) communication system suitable for communicating with one or more wireless access points.

The device 100 may also include one or more wide area network transceiver(s) that may be connected to one or more antennas. The wide area network transceiver comprises suitable devices, hardware, and/or software for communicating with and/or detecting signals to/from other wireless devices within a network. In one aspect, the wide area network transceiver may comprise a CDMA communication system suitable for communicating with a CDMA network of wireless base stations; however in other aspects, the wireless communication system may comprise another type of cellular telephony network or femtocells, such as, for example, TDMA, LTE, LTE Advanced, WCDMA, UMTS, 4G, or GSM. Additionally, any other type of wireless networking technologies may be used, for example, WiMax (802.16), Ultra Wide Band, ZigBee, wireless USB, etc.

Thus, device 100 may be a: mobile device, wireless device, cell phone, personal digital assistant, mobile computer, wearable device (e.g., head mounted display, virtual reality glasses, etc.), robot navigation system, tablet, personal computer, laptop computer, or any type of device that has processing capabilities. As used herein, a mobile device may be any portable, or movable device or machine that is configurable to acquire wireless signals transmitted from, and transmit wireless signals to, one or more wireless communication devices or networks. Thus, by way of example but not limitation, the device 100 may include a radio device, a cellular telephone device, a computing device, a personal communication system device, or other like movable wireless communication equipped device, appliance, or machine. Any operable combination of the above are also considered a "mobile device."

The mobile device may communicate wirelessly with a plurality of wireless APs using RF signals (e.g., 2.4 GHz, 3.6 GHz, and 4.9/5.0 GHz bands) and standardized protocols for the modulation of the RF signals and the exchanging of information packets (e.g., IEEE 802.11x).

It should be appreciated that embodiments of the invention as will be hereinafter described may be implemented through the execution of instructions, for example as stored in the memory 105 or other element, by processor 101 of device and/or other circuitry of device and/or other devices. Particularly, circuitry of device, including but not limited to processor 101, may operate under the control of a program, routine, or the execution of instructions to execute methods or processes in accordance with embodiments of the invention. For example, such a program may be implemented in firmware or software (e.g. stored in memory 105 and/or other locations) and may be implemented by processors, such as processor 101, and/or other circuitry of device. Further, it should be appreciated that the terms processor, microprocessor, circuitry, controller, etc., may refer to any type of logic or circuitry capable of executing logic, commands, instructions, software, firmware, functionality and the like.

Further, it should be appreciated that some or all of the functions, engines or modules described herein may be performed by device itself and/or some or all of the functions, engines or modules described herein may be performed by another system connected through I/O controller 125 or network interface 110 (wirelessly or wired) to device. Thus, some and/or all of the functions may be performed by another system and the results or intermediate calculations may be transferred back to device. In some embodiments, such other device may comprise a server configured to process information in real time or near real time. In some embodiments, the other device is configured to predetermine the results, for example based on a known configuration of the device. Further, one or more of the elements illustrated in FIG. 1 may be omitted from the device 100. For example, one or more of the sensors 130-165 may be omitted in some embodiments.

Figure 2:
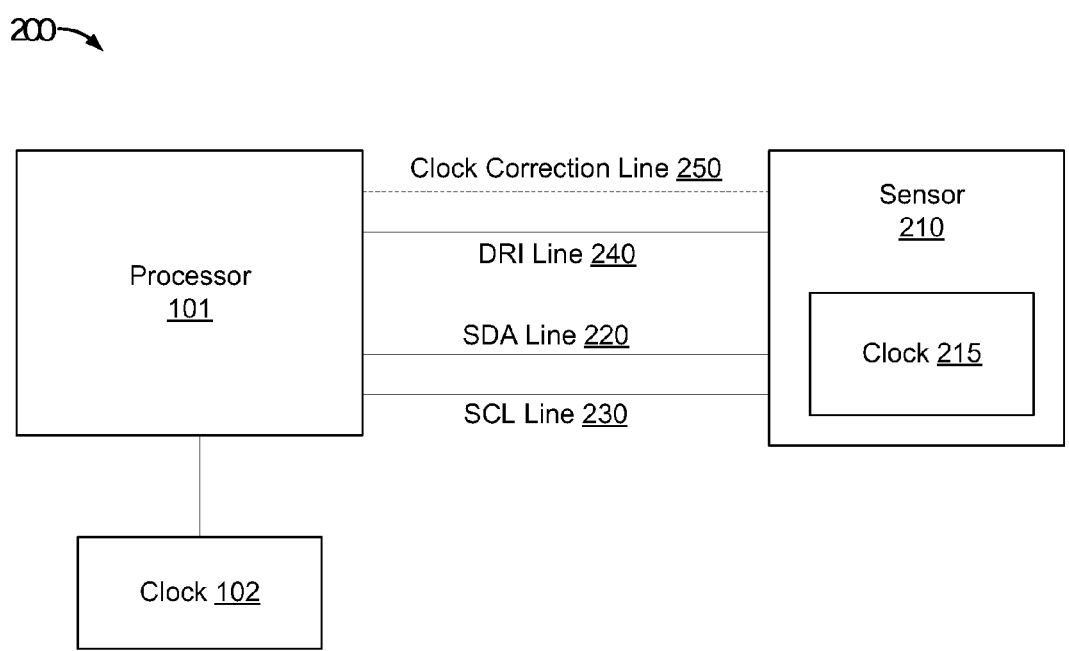
FIG. 2 is block diagram illustrating an exemplary hardware environment in which embodiments of the invention may be practiced.

FIG. 2 is block diagram illustrating an exemplary hardware environment 200 in which embodiments of the invention may be practiced. Processor 101 of device 100 may be provided to receive and process data samples transferred from sensor 210, among other functions. Sensor 210 may be a sensor of any type, as described above. The invention is not limited by the number of sensors, and more sensors (not shown) may be present. In some embodiments, processor 101 may be provided with a clock signal from a clock 102. In other embodiments, an internal clock generator may be embedded with processor 101. Sensor 210 includes an internal clock generator 215, which generates an internal clock signal based on which sensor 210 collects samples. A data connection links processor 101 with sensor 210 and allows for data to be transferred between processor 101 and sensor 210. In the embodiment shown in FIG. 2, the data connection may be an I²C bus comprising a Serial Data (SDA) line 220 and a Serial Clock (SCL) line 230. Both SDA line 220 and SCL line 230 may be pulled up with pull-up resistors (not shown). The operation of an I²C bus is well known in the art, and is not to be described in detail here. The data connection may also be a UART connection, an SPI bus, or any other type of connection suitable for transferring data between a processor and a sensor. In some embodiments, sensor 210 may have a Data Ready Interrupt (DRI) pin, which may be connected to processor 101 via a DRI line 240. In embodiments where more than one sensors are present, DRI lines from the multiple sensors may be multiplexed before being connected to processor 101. In some other embodiments, in addition to or instead of a DRI pin, sensor 210 may have a dedicated clock correction pin, which may be connected to processor 101 via a clock correction line 250.

Computing device 100 may comprise: a sensor 210 including or coupled to a sensor clock 215 and a processor 101 including or coupled to a processor clock 102 to: correct the sensor clock 215 for a first time, transfer data from the sensor 210, and correct the sensor clock 215 for a second time, wherein a time interval between two corrections of the sensor clock 215 may be selected such that the sensor clock 215 is sufficiently aligned with the processor clock 102 over the time interval.

Two methods of transferring data from sensor 210 to processor 101 are commonly utilized. In the first method, also known as the asynchronous method, a sensor 210 with available data to transfer may notify processor 101 by issuing a Data Ready Interrupt (DRI) signal through a dedicated DRI pin, which wakes the processor up from the sleep state, and transfers the data when the processor is ready for the data transfer. In the second method, also known as the synchronous method, processor 101 may wake up from the sleep state spontaneously at predetermined time intervals, and may poll sensor 210 to receive data. The synchronous method is more energy efficient in a device comprising multiple sensors because data transfers from more than one sensors may be consolidated into a single poll and transfer session.

Ideally, assuming a sensor delivers only the most current result, polling a sensor at a frequency that coincides with the sensor's sampling frequency is necessary and sufficient to obtain all the data samples collected by the sensor. However, because processor 101 and sensor 210 do not usually share a clock signal and misalignment of clock signals may result, some sensor data samples may be lost and some sensor data samples may be read twice even when sensor 210 is polled at its sampling frequency. The phenomenon may be exacerbated by the fact that some sensors may have a very poor clock accuracy (i.e., ±15% deviation over the temperature range and from device to device).

Figure 3:
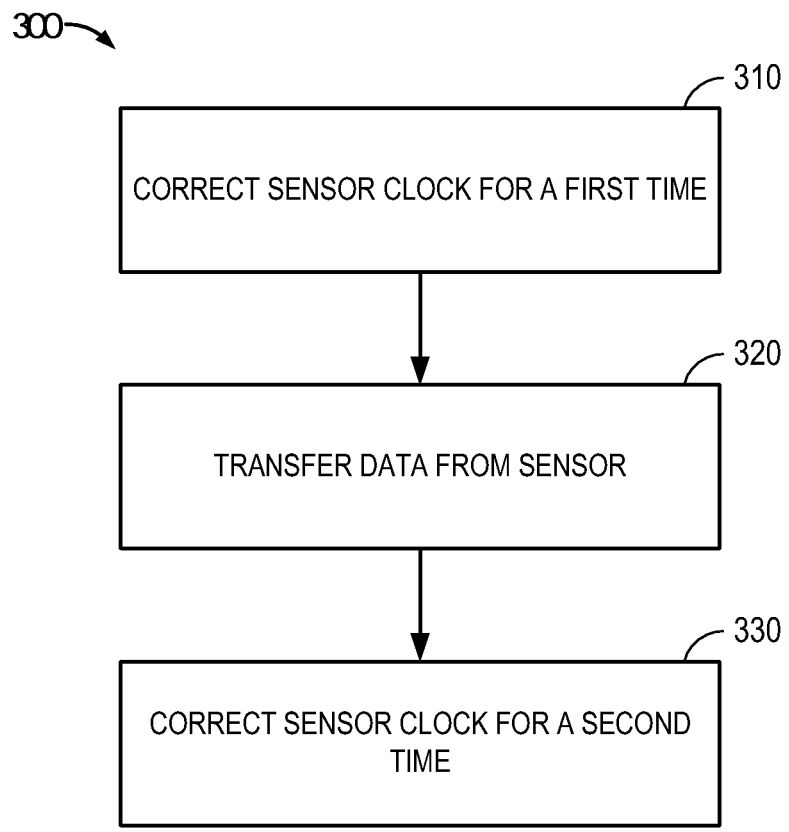
FIG. 3 is a flowchart illustrating an exemplary method for synchronizing sensor clocks.

Referring to FIG. 3, a flowchart illustrating an exemplary method 300 for synchronizing sensor clocks is shown. At operation 310, the sensor clock may be corrected for a first time. Correcting the sensor clock may comprise applying a clock correction factor to the internal sensor clock, on which the sampling events are based, such that the internal sensor clock is sufficiently aligned with the clock signal used by processor 101 (hereinafter processor clock). The internal sensor clock is sufficiently aligned with the processor clock, on which polling events are based, when it can be guaranteed for a sufficiently long period of time that polling the sensor at a frequency that coincides with the sensor's specified sampling frequency will result in receiving all the sensor data samples, with no data sample being lost and no data sample being read twice. It should be noted that when two clock signals are perfectly aligned, the ratio between their real frequencies is equal to the ratio between their specified frequencies. At operation 320, sensor 210 may be polled by processor 101, and sensor data samples may be transferred to processor 101 from sensor 210. Operation 320 may consist of multiple polls and multiple data sample transfers. At operation 330, the sensor clock may be corrected for a second time in the same way it is corrected for the first time in operation 310. The time interval between two corrections of the sensor clock may be selected such that the clock signals remain sufficiently aligned, as defined above, over the interval, inaccuracies of clock signals accumulated over the interval notwithstanding. If the interval selected is too short, energy may be wasted in correcting sensor clocks more often than needed. On the other hand, if the interval selected is too long, clock signals may become misaligned and data sample loss or repetition described above may occur.

The time interval between two sensor clock corrections may be referred to as the Phase Time interval (T_Ph). By performing operations 310 through 330 repeatedly, the internal sensor clock may be kept sufficiently aligned with the processor clock. In some embodiments, T_Ph may be a common multiple of sampling periods of sensors present. For example, in an embodiment where three sensors having sampling frequencies of 200 Hz, 100 Hz, and 10 Hz (corresponding to sampling periods of 5 ms, 10 ms, and 100 ms), respectively, are present, 100 ms may be selected as the T_Ph. It should be appreciated that synchronizing a plurality of sensors substantially simultaneously using a T_Ph that is a common multiple of sampling periods of the plurality of sensors present aligns the sensor clocks with each other and therefore allows the processor to obtain all samples with the fewest wake windows with the synchronous method. In the above-mentioned example, if the sensor clocks of the three sensors with sampling frequencies of 200 Hz, 100 Hz, and 10 Hz are not aligned with each other, the processor may have to wake up a total of 310 times per second to obtain all samples in the worst case scenario, where the processor receives a single sample from a single sensor in each wake window (200 times per second for the 200 Hz sensor, 100 times per second for the 100 Hz sensor, and 10 times per second for the 10 Hz sensor). On the other hand, if the sensor clocks of the three sensors are aligned as described above, the processor needs to wake up only 200 times every second to obtain all samples: the 200 Hz sensor is polled every time the processor wakes up; the 100 Hz sensor is polled every other time the processor wakes up; and the 10 Hz sensor is polled every 20 times the processor wakes up. Reducing the number of wake windows required is desirable because it conserves power and extends the battery life. In some embodiments, T_Ph may be approximately 1 second. T_Ph may also be adjusted at run-time in embodiments where clock-related feedback information is provided by sensor 210.

A number of non-limiting methods for correcting the sensor clock have been contemplated. In some embodiments, sensor 210 may receive information relating to the processor clock, derive the clock correction factor, and apply the clock correction factor. In some embodiments, sensor 210 may send information relating to its internal clock to processor 101, receive the clock correction factor derived at processor 101, and apply the clock correction factor.

For embodiments where clock-related information is exchanged between processor 101 and sensor 210, a number of non-limiting methods for exchanging clock-related information have been contemplated. In some embodiments, the clock information may be transferred using DRI line 240. In some embodiments, the clock information may be transferred using a dedicated clock correction line 250. In yet some other embodiments, the clock information may be transferred using a regular data connection between processor 101 and sensor 210, such as an I²C bus described above.

First Group of Embodiments

In the first group of embodiments, sensor 210 may receive information relating to the processor clock, derive the clock correction factor, and apply the clock correction factor when the sensor clock is being corrected.

In one embodiment, when the sensor clock is being corrected, processor 101 may transmit a burst of pulses consisting of a predetermined number of pulses to sensor 210. The burst of pulses may be derived from the processor clock and its frequency may be dependent on that of the processor clock. The burst need last only a relatively short period of time. Here, sensor 210 may be configured a priori with the expected frequency of the burst. Once sensor 210 receives the burst, it may compare the frequency of the burst received with the expected frequency, derive a clock correction factor accordingly, and apply the clock correction factor to correct the internal sensor clock.

In another embodiment, when the sensor clock is being corrected, processor 101 may transmit two pulses spaced by a predetermined time interval as measured by the processor clock to sensor 210. The time interval is chosen such that it can be reliably used to derive a clock correction factor to correct the sensor clock. This time interval may be referred to as the Frequency Time interval (T_Fq). In some embodiments, T_Fq may be in the range of a few milliseconds. In some embodiments, T_Fq is chosen to coincide with the shortest sensor sampling period present. In some other embodiments, T_Fq may be chosen to be as long as T_Ph. For example, T_Fq may be 1 second. Here, sensor 210 may be configured a priori with the predetermined T_Fq. Once sensor 210 receives the two pulses, it may compare the duration of the time interval bookended by the two pulses received, as measured by the sensor clock, with the predetermined T_Fq, also as measured by the sensor clock, derive a clock correction factor accordingly, and apply the clock correction factor to correct the internal sensor clock.

In yet another embodiment, when the sensor clock is being corrected, processor 101 may transmit clock correction messages to sensor 210 over the data connection between processor 101 and sensor 210 such that two identifiable significant edges generated during a transmission of clock correction messages are spaced by a predetermined T_Fq, as measured by the processor clock. As described above, the data connection between processor 101 and sensor 210 may be an I²C bus. It may also be a UART connection, an SPI bus, or any other type of connection suitable for transferring data between a processor and a sensor. The predetermined T_Fq may be the same as described above. Here, sensor 210 may be configured a priori with the predetermined T_Fq. Once sensor 210 receives the clock correction messages, it may compare the duration of the time interval bookended by the two identifiable significant edges included with the clock correction messages, as measured by the sensor clock, with the predetermined T_Fq, also as measured by the sensor clock, derive a clock correction factor accordingly, and apply the clock correction factor to correct the internal sensor clock.

For example, in an embodiment where the data connection between processor 101 and sensor 210 is an I²C bus, two clock correction messages may be transmitted. These two clock correction messages may be referred to as MS1 and MS2, respectively. T_Fq may be bookended by the falling edge on SDA line 220 in the START condition for MS1 and the falling edge on SDA line 220 in the START condition for MS2, or may alternatively be bookended by the rising edge on SDA line 220 in the STOP condition for MS1 and the falling edge on SDA line 220 in the START condition for MS2. In embodiments where T_Fq is chosen to be as long as T_Ph, only one clock correction message, e.g., MS1, may be required, and the MS1 message may be transmitted by processor 101, for example, at the beginning of each T_Ph. Thus, the time period T_Fq that is equal to T_Ph may be bookended by, for example, in one embodiment, the falling edges on SDA line 220 in the START condition for two consecutive MS1 messages. Of course, the invention is not limited by the examples provided herein. Moreover, the use of the I²C bus for the purpose of correcting the sensor clock also allows for supplementary error correction procedures, fault detections, and abort commands, etc. For example, sensor 210 may transmit a time stamp or a message including time deviation information and processor 101 may correct the subsequent streams of data accordingly. By utilizing this procedure, the accuracy requirements of T_Ph may be relaxed. Other ways of exploiting the bi-directional communication abilities of the I²C bus for clock correction purposes have also been contemplated.

Second Group of Embodiments

In the second group of embodiments, sensor 210 may send information relating to its internal clock to processor 101, receive the clock correction factor derived at processor 101, and apply the clock correction factor when the sensor clock is being corrected.

In one embodiment, when the sensor clock is being corrected, sensor 210 may transmit two pulses spaced by a predetermined T_Fq as measured by the sensor clock to processor 101. The predetermined T_Fq may be the same as described above. Here, processor 101 may be configured a priori with the predetermined T_Fq. Once processor 101 receives the two pulses, it may compare the duration of the time interval bookended by the two pulses received, as measured by the processor clock, with the predetermined T_Fq, also as measured by the processor clock, derive a clock correction factor accordingly, and transmit the clock correction factor to sensor 101 via the data connection between processor 101 and sensor 210, such as an I²C bus. Sensor 210 then may receive the data correction factor and apply it.

Third Group of Embodiments

In the third group of embodiments, no clock correction factor is used. In these embodiments, the processor clock, or a signal derived from the processor clock, may be provided to sensor 210, and sensor 210 may base the sampling events directly on the processor clock or the signal derived from the processor clock. The processor clock or the signal derived from the processor clock may be transmitted using a dedicated line, a DRI line 240, or may be transmitted within messages transferred on the data connection between processor 101 and sensor 210.

In one embodiment, processor 101 may generate a sampling clock signal based on the processor clock, and transmit the sampling clock to sensor 210. The frequency of the sampling clock may be the same as the sampling frequency of sensor 210. Sensor 210 may be configured to ignore its internal sensor clock and collect a sample only when it encounters a pulse in the sampling clock signal transmitted by processor 101.

In one embodiment where multiple sensors are present, the frequency of the sampling clock signal generated by processor 101 may be selected such that the frequency of the sampling clock signal is a common multiple of sampling frequencies of sensors present. For example, for an embodiment where three sensors having sampling frequencies of 200 Hz, 100 Hz, and 10 Hz, respectively, are present, processor 101 may generate a sampling clock signal with a frequency of 200 Hz based on the processor clock and transmit the sampling clock signal to all three sensors. Then, the sensor with the 200 Hz sampling frequency may be configured to collect a sample at every pulse it encounters in the sampling clock signal; the sensor with the 100 Hz sampling frequency may be configured to collect a sample at every other pulse it encounters in the sampling clock signal; and the sensor with the 10 Hz sampling frequency may be configured to collect a sample at every 20th pulse it encounters in the sampling clock signal.

It should be appreciated that because the sampling clock is based on the processor clock, sampling events of sensor 210 and polling events of processor 101 may always be aligned.

It should also be appreciated that in some embodiments, the sampling clock signal may serve as the polling signal as well at the same time.

In another embodiment, the processor clock may be directly provided to sensor 210, and sensor 210 may base the sampling events on the processor clock instead of its internal sensor clock.

By utilizing the exemplary methods for synchronizing sensor clocks described herein, a processor may coordinate clock corrections for sensors and receive all sensor data samples from multiple sensors in batches in an energy-efficient synchronous mode, without wasting energy in polling the sensors at a frequency that is higher than necessary.

It should be appreciated that aspects of the invention previously described may be implemented in conjunction with the execution of instructions (e.g., applications) by processor 101 of computing device 100, as previously described. Particularly, circuitry of the device, including but not limited to processor, may operate under the control of an application, program, routine, or the execution of instructions to execute methods or processes in accordance with embodiments of the invention (e.g., the processes of FIG. 3). For example, such a program may be implemented in firmware or software (e.g., stored in memory and/or other locations) and may be implemented by processors and/or other circuitry of the devices. Further, it should be appreciated that the terms processor, microprocessor, circuitry, controller, etc., refer to any type of logic or circuitry capable of executing logic, commands, instructions, software, firmware, functionality, etc.

Methods described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

Example methods, apparatuses, or articles of manufacture presented herein may be implemented, in whole or in part, for use in or with mobile communication devices. As used herein, "mobile device," "mobile communication device," "hand-held device," "tablets," etc., or the plural form of such terms may be used interchangeably and may refer to any kind of special purpose computing platform or device that may communicate through wireless transmission or receipt of information over suitable communications networks according to one or more communication protocols, and that may from time to time have a position or location that changes. As a way of illustration, special purpose mobile communication devices, may include, for example, cellular telephones, satellite telephones, smart telephones, heat map or radio map generation tools or devices, observed signal parameter generation tools or devices, personal digital assistants (PDAs), laptop computers, personal entertainment systems, e-book readers, tablet personal computers (PC), personal audio or video devices, personal navigation units, or the like. It should be appreciated, however, that these are merely illustrative examples relating to mobile devices that may be utilized to facilitate or support one or more processes or operations described herein.

The methodologies described herein may be implemented in different ways and with different configurations depending upon the particular application. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

The herein described storage media may comprise primary, secondary, and/or tertiary storage media. Primary storage media may include memory such as random access memory and/or read-only memory, for example. Secondary storage media may include mass storage such as a magnetic or solid state hard drive. Tertiary storage media may include removable storage media such as a magnetic or optical disk, a magnetic tape, a solid state storage device, etc. In certain implementations, the storage media or portions thereof may be operatively receptive of, or otherwise configurable to couple to, other components of a computing platform, such as a processor.

In at least some implementations, one or more portions of the herein described storage media may store signals representative of data and/or information as expressed by a particular state of the storage media. For example, an electronic signal representative of data and/or information may be "stored" in a portion of the storage media (e.g., memory) by affecting or changing the state of such portions of the storage media to represent data and/or information as binary information (e.g., ones and zeroes). As such, in a particular implementation, such a change of state of the portion of the storage media to store a signal representative of data and/or information constitutes a transformation of storage media to a different state or thing.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels.

Unless specifically stated otherwise, as apparent from the following discussion, it is appreciated that throughout this specification discussions utilizing terms such as "processing," "computing," "calculating,", "identifying", "determining", "establishing", "obtaining", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in some implementations" or other like phrases in various places throughout this specification are not necessarily all referring to the same feature, example, and/or limitation. Furthermore, the particular features, structures, or characteristics may be combined in one or more examples and/or features.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A method for synchronizing a first sensor clock of a first sensor, comprising:
   correcting the first sensor clock for a first time;
   transferring data from the first sensor; and
   correcting the first sensor clock for a second time,
   wherein a time interval between the two corrections of the first sensor clock is selected such that the first sensor clock is sufficiently aligned with a processor clock of a processor over the time interval, and wherein correcting the first sensor clock further comprises:
   receiving information related to the processor clock;
   deriving a clock correction factor; and
   applying the clock correction factor.

2. The method of claim 1, wherein the information related to the processor clock is received over a dedicated line, a Data Ready Interrupt (DRI) line, or a data connection between the processor and the first sensor.

3. The method of claim 1, wherein the information related to the processor clock includes a frequency or a time period.

4. The method of claim 1, further comprising:
   correcting a second sensor clock of a second sensor for a first time;
   transferring data from the second sensor; and correcting the second sensor clock for a second time,
wherein the correction of the first sensor clock for the first time and the correction of the second sensor clock for the first time takes place simultaneously, and the correction of the first sensor clock for the second time and the correction of the second sensor clock for the second time takes place simultaneously, and wherein the time interval is a common multiple of a sampling period of the first sensor and a sampling period of the second sensor.

5. The method of claim 1, wherein the first sensor clock is sufficiently aligned with the processor clock over the time interval when polling the first sensor at a polling frequency as measured by the processor clock that coincides with a specified sampling frequency of the first sensor results in every data sample of the first sensor being read exactly once over the time interval.

6. A computing device, comprising:
a first sensor including or coupled to a first sensor clock; and
a processor including or coupled to a processor clock to:
correct the first sensor clock for a first time,
transfer data from the first sensor, and
correct the first sensor clock for a second time,
wherein a time interval between the two corrections of the first sensor clock is selected such that the first sensor clock is sufficiently aligned with the processor clock over the time interval, and wherein the correction of the first sensor clock comprises:
receiving information related to the processor clock;
deriving a clock correction factor; and
applying the clock correction factor.

7. The computing device of claim 6, wherein the information related to the processor clock is received over a dedicated line, a Data Ready Interrupt (DRI) line, or a data connection between the processor and the first sensor.

8. The computing device of claim 6, wherein the information related to the processor clock includes a frequency or a time period.

9. The computing device of claim 6, further comprising:
a second sensor including or coupled to a second sensor clock,
wherein the processor is further configured to:
correct the second sensor clock for a first time,
transfer data from the second sensor, and
correct the second sensor clock for a second time,
wherein the correction of the first sensor clock for the first time and the correction of the second sensor clock for the first time takes place simultaneously, and the correction of the first sensor clock for the second time and the correction of the second sensor clock for the second time takes place simultaneously, and wherein the time interval is a common multiple of a sampling period of the first sensor and a sampling period of the second sensor.

10. The computing device of claim 6, wherein the first sensor clock is sufficiently aligned with the processor clock over the time interval when polling the first sensor at a polling frequency as measured by the processor clock that coincides with a specified sampling frequency of the first sensor results in every data sample of the first sensor being read exactly once over the time interval.

11. A computing device, comprising:
means for correcting a first sensor clock of a first sensor for a first time;
means for transferring data from the first sensor; and
means for correcting the first sensor clock for a second time,
wherein a time interval between the two corrections of the first sensor clock is selected such that the first sensor clock is sufficiently aligned with a processor clock of a processor over the time interval, and wherein the means for correcting the first sensor clock further comprises:
means for receiving information related to the processor clock;
means for deriving a clock correction factor; and
means for applying the clock correction factor.

12. The computing device of claim 11, wherein the information related to the processor clock is received over a dedicated line, a Data Ready Interrupt (DRI) line, or a data connection between the processor and the first sensor.

13. The computing device of claim 11, wherein the information related to the processor clock includes a frequency or a time period.

14. The computing device of claim 11, further comprising:
means for correcting a second sensor clock of a second sensor for a first time;
means for transferring data from the second sensor; and
means for correcting the second sensor clock for a second time,
wherein the correction of the first sensor clock for the first time and the correction of the second sensor clock for the first time takes place simultaneously, and the correction of the first sensor clock for the second time and the correction of the second sensor clock for the second time takes place simultaneously, and wherein the time interval is a common multiple of a sampling period of the first sensor and a sampling period of the second sensor.

15. A non-transitory computer-readable medium including code which, when executed by a processor, causes the processor to perform a method comprising:
correcting a first sensor clock of a first sensor for a first time;
transferring data from the first sensor; and
correcting the first sensor clock for a second time,
wherein a time interval between the two corrections of the first sensor clock is selected such that the first sensor clock is sufficiently aligned with a processor clock of the processor over the time interval, and wherein code for correcting the first sensor clock further comprises code for:
receiving information related to the processor clock;
deriving a clock correction factor; and
applying the clock correction factor.

16. The non-transitory computer-readable medium of claim 15, wherein the information related to the processor clock is received over a dedicated line, a Data Ready Interrupt (DRI) line, or a data connection between the processor and the first sensor.

17. The non-transitory computer-readable medium of claim 15, wherein the information related to the processor clock includes a frequency or a time period.

18. The non-transitory computer-readable medium of claim 15, further comprising code for:
correcting a second sensor clock of a second sensor for a first time;
transferring data from the second sensor; and
correcting the second sensor clock for a second time,
wherein the correction of the first sensor clock for the first time and the correction of the second sensor clock for the first time takes place simultaneously, and the correction of the first sensor clock for the second time and the correction of the second sensor clock for the second time takes place simultaneously, and wherein the time interval is a common multiple of a sampling period of the first sensor and a sampling period of the second sensor.

\* \* \* \* \*